United States Patent [19]

Sugiyama

[11] Patent Number: 5,020,812

[45] Date of Patent: Jun. 4, 1991

[54] FOUR-WHEEL STEERING SYSTEM IN WHEELED VEHICLE

[75] Inventor: Mizuho Sugiyama, Toyota, Japan

[73] Assignee: Toyota Jidosha Kabushiki Kaisha, Toyota, Japan

[21] Appl. No.: 545,065

[22] Filed: Jun. 29, 1990

[30] Foreign Application Priority Data

Jun. 30, 1989 [JP] Japan .................. 1-170730

[51] Int. Cl.$^5$ ................ B62D 3/08; B62D 7/15
[52] U.S. Cl. ........................ 280/91; 74/499
[58] Field of Search ..................... 280/91; 74/499

[56] References Cited

U.S. PATENT DOCUMENTS

| 4,779,880 | 10/1988 | Hyodo ............................. 280/91 |
| 4,949,984 | 8/1990 | Vemura et al. .................. 280/91 |

FOREIGN PATENT DOCUMENTS 60-64073  4/1985  Japan .

Primary Examiner—Charles A. Marmor
Assistant Examiner—Karin Tyson
Attorney, Agent, or Firm—Cushman, Darby & Cushman

[57] ABSTRACT

In a four-wheel steering system for a wheeled vehicle, a rear-wheel steering mechanism includes an input shaft drivingly connected at its front end to a front-steering wheel mechanism through a mechanical linkage, a lateral relay rod arranged perpendicularly to the input shaft and being drivingly connected to the input shaft to be rotated in accordance with a rotation angle of the input shaft, the relay rod having an intermediate portion formed thereon with a screw groove containing therein a plurality of balls and being operatively connected at the opposite ends thereof to a pair of dirigible rear road wheels, a ball nut assembled with a rear end of the input shaft and having an axial bore formed with a screw groove containing therein the balls, the ball nut being coupled over the intermediate portion of the relay rod through the balls to effect axial displacement of the relay rod in accordance with rotary motion of the same. The ball nut is arranged to be axially displaced in the opposite direction relative to the displacement direction of the relay rod when the input shaft is rotated at a small angle.

4 Claims, 5 Drawing Sheets

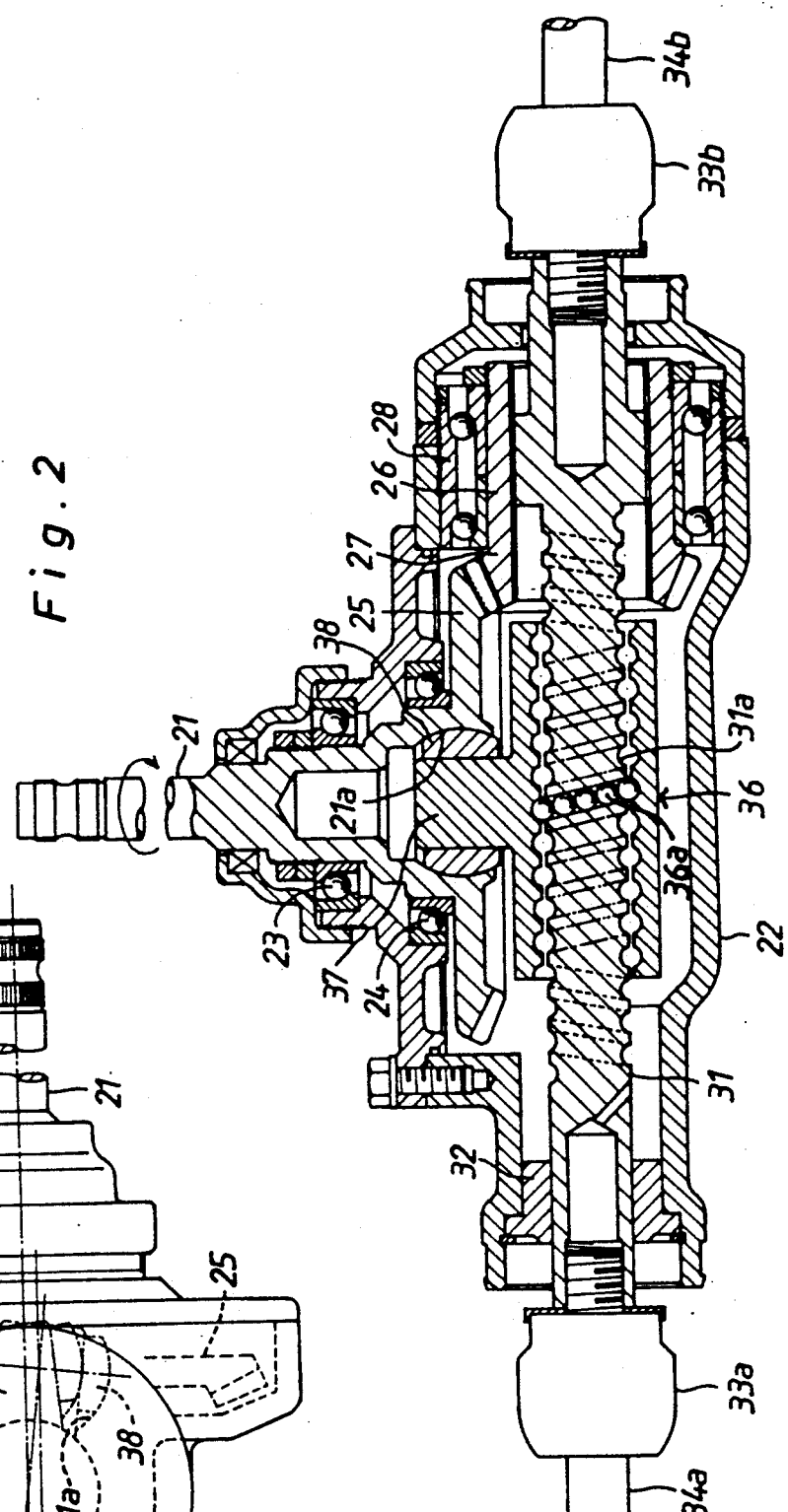
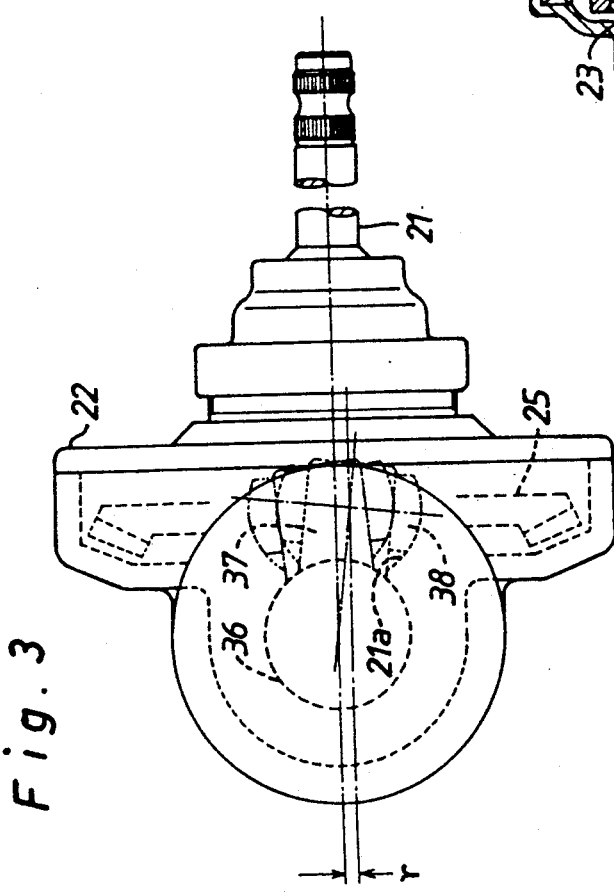

5,020,812

FOUR-WHEEL STEERING SYSTEM IN WHEELED VEHICLE

BACKGROUND OF THE INVENTION

1. Field of the Invention

The present invention relates to a steering system in a wheeled vehicle, and more particularly to a four-wheel steering system in a wheeled vehicle the front-wheel steering mechanism of which is drivingly interconnected to a rear-wheel steering mechanism by means of a mechanical linkage to steer the dirigible rear road wheels in dependence upon the turn-angle of the steering wheel of the vehicle.

2. Description of the Prior Art

In Japanese Patent Early Publication No. 60-64073, there has been proposed a four-wheel steering system in a wheeled vehicle the front-wheel steering mechanism of which is drivingly interconnected to a rear-wheel steering mechanism by means of a mechanical linkage composed of front and rear connecting shafts. Disposed between the front and rear connecting shafts is a coupling which includes drive and driven members assembled in such a manner as to establish torque transmission between the connecting shafts only when the front connecting shaft is rotated at a large angle. In the coupling, the drive member is circumferentially spaced in a predetermined distance from the driven member to make the torque transmission between the connecting shafts ineffective when the front connecting shaft is rotated at a small angle. Under control of the coupling, the rear road wheels are maintained in their neutral positions when the front road wheels are steered at a small angle and steered in the opposite direction relative to the front road wheels when the front road wheels are steered at a large angle. This is useful to ensure travel stability of the vehicle at a high speed and to enhance maneuverability of the vehicle at a low speed.

In the four-wheel steering system, however, the coupling does not act to restrain movement of the rear-wheel steering mechanism either in a direction when the steering wheel is operated to rotate the front connecting shaft at a small angle. When the steering wheel is operated to rotate the front connecting shaft at a large angle, the coupling acts to restrain movement of the rear-wheel steering mechanism in one direction but does not act to restrain movement of the same in the other direction. For this reason, the rear-wheel steering mechanism is provided therein with resilient means for biasing the rear road wheels toward their neutral positions and for retaining the rear road wheels in their steered positions. In the rear-wheel steering mechanism, it is required to make the biasing force of the resilient means sufficient for resisting against a reaction force acting on the rear road wheels from road surfaces. As a result, the rear-wheel steering mechanism is complicated in construction and large in size. Moreover, the biasing force of the resilient means acts as a reaction force on the front connecting shaft when the steering wheel has been operated to rotate the front connecting shaft at a large angle. In this instance, the driver is obliged to increase his effort applied to the steering wheel and feels unstable in his steering operation.

SUMMARY OF THE INVENTION

It is, therefore, a primary object of the present invention to provide an improved rear-wheel steering mechanism capable of overcoming such problems as described above.

According to the present invention, the primary object is attained by providing a rear-wheel steering mechanism which comprises a housing mounted on a body structure of the vehicle, an input shaft rotatably mounted within the housing and having a front end drivingly connected to a front-wheel steering mechanism through a mechanical linkage, a lateral relay rod arranged perpendicularly to the axis of the input shaft and being axially slidably and rotatably mounted within the housing, the relay rod having an intermediate portion formed thereon with a screw groove containing therein a plurality of balls and being operatively connected at the opposite ends thereof to a pair of dirigible rear road wheels, means for effecting rotary motion of the relay rod in accordance with a rotation angle of the input shaft, a ball nut assembled with a rear end of the input shaft and having an axial bore formed with a screw groove containing therein the balls, the ball nut being coupled over the intermediate portion of the relay rod through the balls to effect axial displacement of the relay rod in accordance with rotary motion of the same, and means for effecting axial displacement of the ball nut in the opposite direction relative to the displacement direction of the relay rod in accordance with the rotation angle of the input shaft when the input shaft is rotated at a small angle.

In a preferred embodiment of the present invention, the means for effecting rotary motion of the relay rod comprises a first bevel gear of large diameter mounted on the rear end of the input shaft and a second bevel gear of small diameter formed on one end of a sleeve member and being in meshing engagement with the first bevel gear, the sleeve member being rotatably mounted within the housing in surrounding relationship with the relay rod and connected to the relay rod for rotation therewith, and the means for effecting axial displacement of the ball nut comprises a spherical bearing rotatably coupled within the rear end of the input shaft and a radial projection integrally provided with the ball nut and being axially slidably supported by the spherical bearing, the radial projection having an axis inclined at a predetermined angle with respect to the axis of the input shaft such that the center of the spherical bearing is displaced in a predetermined distance from the axis of the input shaft in a condition where the input shaft is maintained in a neutral position.

BRIEF DESCRIPTION OF THE DRAWINGS

Additional objects, features and advantages of the present invention will become more readily apparent from the following detailed description of preferred embodiments thereof when taken together with the accompanying drawings, in which:

FIG. 2 is an enlarged sectional plan view of the rear-wheel steering mechanism shown in FIG. 1;

FIG. 3 is a side view of the rear-wheel steering mechanism shown in FIG. 2;

DESCRIPTION OF THE PREFERRED EMBODIMENTS

Figure 1:
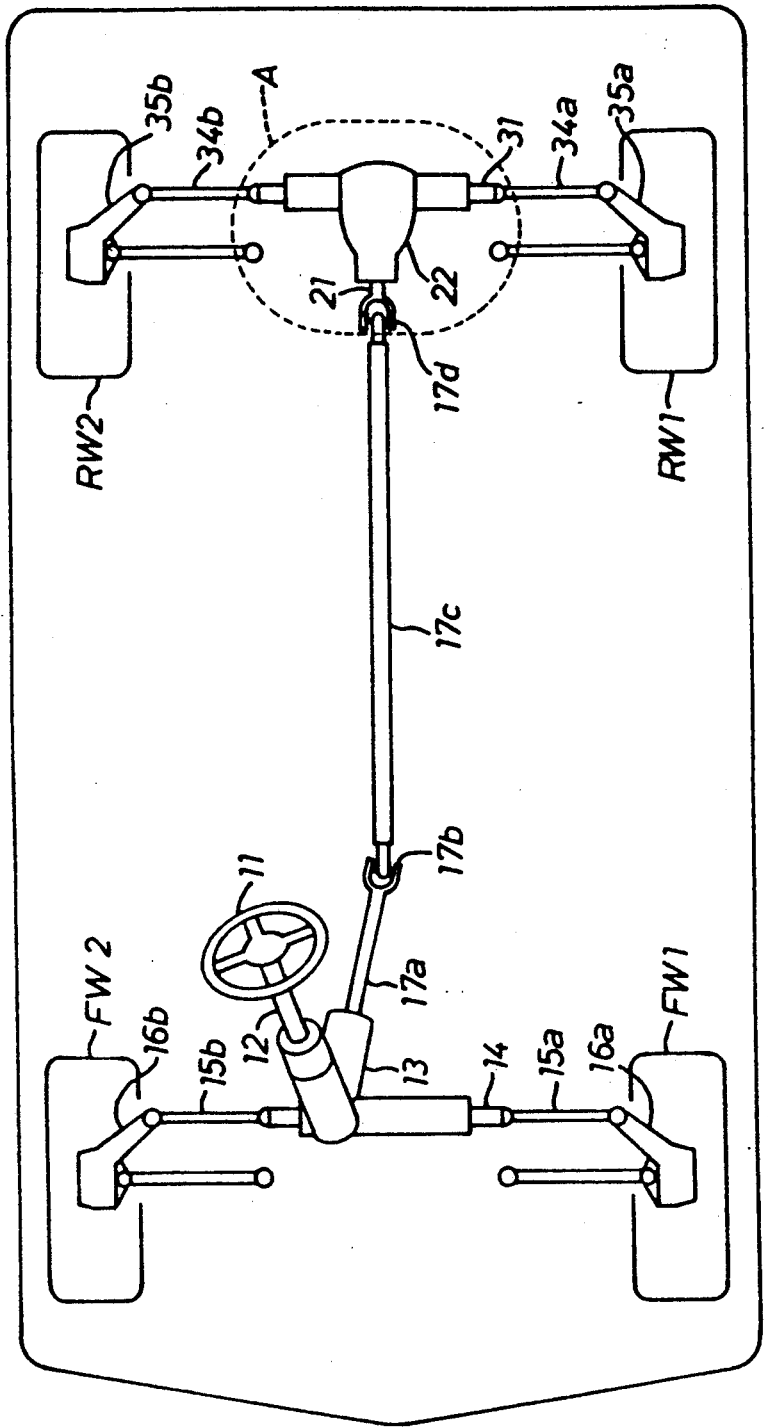
FIG. 1 is a schematic plan view of a four-wheel steering system including a rear-wheel steering mechanism in accordance with the present invention.

Referring now to the drawings, particularly in FIG. 1, there is schematically illustrated a four-wheel steering system in a wheeled vehicle the front wheel steering mechanism of which includes a gear box 13 drivingly connected to a steering wheel 11 by means of a steering shaft 12, a rack bar 14 arranged to be axially displaced by rotation of a pinion meshed thereto in the gear box 13, a pair of tie rods 15a, 15b each connected to the opposite ends of rack bar 14 by means of a ball joint, and a pair of knuckle arms 16a, 16 each connected to the tie rods 15a, 15b by means of a ball joint to steer a pair of dirigible front road wheels FW1, FW2 in response to axial displacement of the rack bar 14. In the gear box 13, the rack bar 14 is drivingly connected to the front end of a front connecting shaft 17a the rear end of which is drivingly connected to the front end of a rear connecting shaft 17c by means of a coupling 17b. The rear connecting shaft 17c is arranged in a fore-and-aft direction of the vehicle and is drivingly connected at its rear end to the front end of an input shaft 21 of a rear-wheel steering mechanism A by means of a coupling 17d.

As shown in FIG. 2, the input shaft 21 extends forwardly from a housing 22 supported on a body structure of the vehicle and is rotatably mounted within the housing 22 by means of axially spaced ball bearings 23 and 24 for rotation about its axis. The input shaft 21 has a rear end which is integrally formed with a bevel gear 25 of large diameter. A sleeve member 26 is arranged on a lateral axis perpendicular to the axis of input shaft 21 and is rotatably mounted within the housing 22 by means of a multi-angular ball bearing 28. The sleeve member 26 is integrally formed at its inner end with a bevel gear 27 of small diameter which is permanently in meshing engagement with the bevel gear 25. The multi-angular ball bearing 28 is threaded into the housing 22 at its outer race for adjustment of a backlash between the bevel gears 25 and 27.

As shown in FIGS. 1 and 2, the rear-wheel steering mechanism A includes a lateral relay rod 31 assembled within the housing 22 to be displaced in a lateral direction of the vehicle. The lateral relay rod 31 has one end portion axially slidably and rotatably supported by a guide member 32 fixed in the housing 22 and the other end portion splined at its outer periphery to the sleeve member 26 for rotation therewith. The lateral relay rod 31 is provided at its opposite ends with a pair of ball joints 33a, 33b threadedly fixed thereto and rotatably coupled with each inner end of tie rods 34a, 34b. The tie rods 34a, 34b are operatively connected at their outer ends to a pair of dirigible rear road wheels RW1, RW2 by means of a pair of knuckle arms 35a, 35b. The lateral relay rod 31 is formed at its intermediate portion with a screw groove 31a for receiving therein a plurality of balls 36a. A cylindrical ball nut 36 is threadedly coupled over the intermediate portion of lateral relay rod 31 through the balls 36a. The ball nut 36 is integrally formed at its front face with a columnar radial projection 37 which is pivotally connected to the rear end of input shaft 21 through a spherical bearing 38. The spherical bearing 38 is rotatably coupled within a corresponding spherical bore 21a in the rear end of input shaft 21 to slidably support the radial projection 37 of ball nut 36 thereon. As shown in FIG. 3, the axis of radial projection 37 is inclined at a predetermined angle with respect to the central axis of input shaft 21 such that the center of spherical bearing 38 is displaced in a distance r downwardly from the central axis of input shaft 21 in a condition where the input shaft 21 is maintained in a neutral position.

Figure 4A:
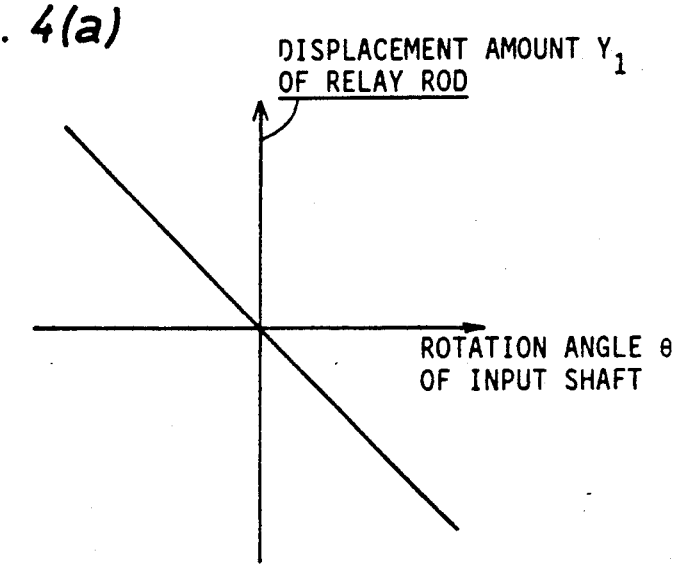
FIG. 4(a) is a graph showing a relative displacement of a lateral relay rod to a ball nut in relation to a rotation angle of an input shaft.
Figure 4B:
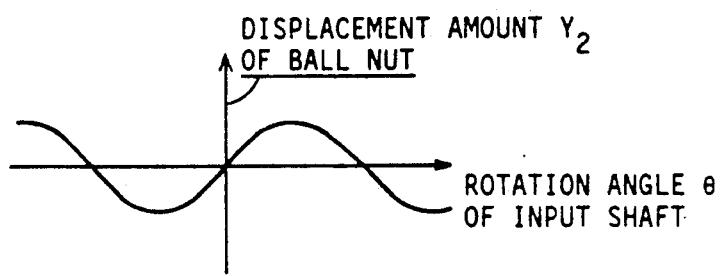
FIG. 4(b) is a graph showing a displacement amount of the ball nut in relation to the rotation angle of the input shaft.
Figure 4C:
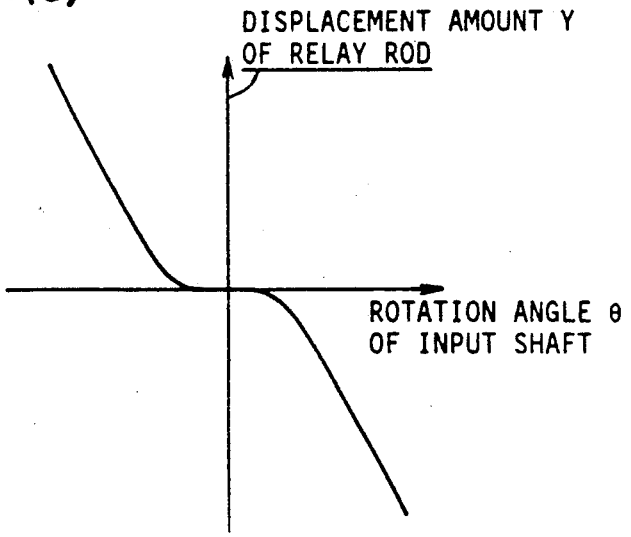
FIG. 4(c) is a graph showing a displacement amount of the lateral relay rod in relation to the rotation angle of the input shaft.

Hereinafter, the operation of the four-wheel steering system will be described in detail with reference to FIGS. 4(a)-4(c). When the steering wheel 11 is operated to turn the vehicle to the right or left, the rack bar 14 is displaced in a lateral direction to steer the front road wheels FW1, FW2 and to rotate the front and rear connecting shafts 17a, 17c through the coupling 17b. The rotary motion of connecting shafts 17a, 17c is transmitted to the intermeshed bevel gears 25 and 27 through the coupling 17d and input shaft 21 to rotate the sleeve member 26 about its axis. In turn, the lateral relay rod 31 rotates with the sleeve member 26 and is axially displaced by relative rotation to the ball nut 36. In this instance, the axial displacement amount of relay rod 31 is caused in proportion to the rotation angle of sleeve member 26. Assuming that the steering wheel 11 has been rotated to the right, the input shaft 21 rotates clockwisely as shown by an arrow in FIG. 2, and in turn, the lateral relay rod 31 is axially displaced rightward. The displacement amount $Y_1$ of relay rod 31 relative to the ball nut 36 will change as shown in FIG. 4(a) on a basis of the following function:

$$Y_1 = -nL\theta/2\pi$$

where n is a gear ratio of bevel gears 25 and 27, L is a lead of screw groove 31a, and $\theta$ is a rotation angle of input shaft 21.

During rotation of the input shaft 21, the spherical bearing 38 rotates to allow slide movement of the radial projection 37 of ball nub 36 thereon. This causes rotary motion of the axis of radial projection 37 about the central axis of input shaft 21. Assuming that the input shaft 21 has been rotated clockwisely in FIG. 2 in a condition where the radial projection 37 of ball nut 36 is in the neutral position as shown by broken lines in FIG. 3, the axis of radial projection 37 is displaced leftward with respect to the central axis of input shaft 21. In other words, the ball nut 36 is displaced in an opposite direction to the displacement direction of relay rod 31. In this instance, the displacement of radial projection 37 in a vertical direction is absorbed by rotation of the ball nut 36. Thus, the leftward displacement amount $Y_2$ of ball nut 36 relative to the housing 22 will change as shown in FIG. 4(b) on a basis of the following sinusoidal wave function:

$$Y_2 = r \sin \theta$$

From the above description, it will be understood that the ball nut 36 itself is axially displaced in the opposite direction when the relay rod 31 is being axially displaced in accordance with rotation of the input shaft 21. Accordingly, the actual displacement amount Y of relay rod 31 relative to the housing 22 is defined by addition of the displacement amounts $Y_1$ and $Y_2$, as shown in FIG. 4(c). In the case that the values r, n and L are determined to satisfy $r \approx n\ L/2\pi$, an absolute value of $Y_1 = -n\ L\ \theta/2\pi = -\gamma\theta$ becomes equal to that of $Y_2 = r\ \sin\ \theta$ on a basis of $\theta \approx \sin\ \theta$. This means that when the steering wheel 11 is operated to steer the front road wheels FW1, FW2 at a small angle, the actual displacement amount Y of relay rod 31 relative to the housing 22 becomes zero to retain the rear road wheels RW1, RW2 in their neutral positions.

When the steering wheel 11 is operated to steer the front road wheels FW1, FW2 at a large angle, the displacement amount $Y_1$ of relay rod 31 exceeds the displacement amount $Y_2$ of ball nut 36. Accordingly, the actual displacement amount Y of relay rod 31 relative to the housing 22 will increase in accordance with an increase of the rotation angle of input shaft 21. In this instance, the relay rod 31 is displaced rightward in response to clockwise rotation of the input shaft 21. As a result, the rear road wheels RW1, RW2 are steered in the opposite direction relative to the front road wheels FW1, FW2, and the steering angle of rear road wheels RW1, RW2 is increased in accordance with an increase of the steering angle of front road wheels FW1, FW2.

As is understood from the above description, the rear-wheel steering mechanism is designed to provide an insensitive region for retaining the rear road wheels RW1, RW2 in their neutral positions when the steering wheel 11 is operated to steer the front road wheels FW1, FW2 at a small angle. This is useful to ensure travel stability of the vehicle at a high speed. The rear-wheel steering mechanism is also designed to steer the rear road wheels RW1, RW2 in the opposite direction relative to the front road wheels FW1, FW2 when the steering wheel 11 is rotated at a large angle. This is useful to enhance maneuverability of the vehicle during travel at a low speed. In the rear-wheel steering mechanism, the lateral relay rod 31 is mechanically connected to the front-wheel steering mechanism in such a manner that the displacement of relay rod 31 is constantly restrained by the steering wheel 11. Thus, the relay rod 31 can be retained in its neutral position without any biasing force applied thereto.

Figure 5:
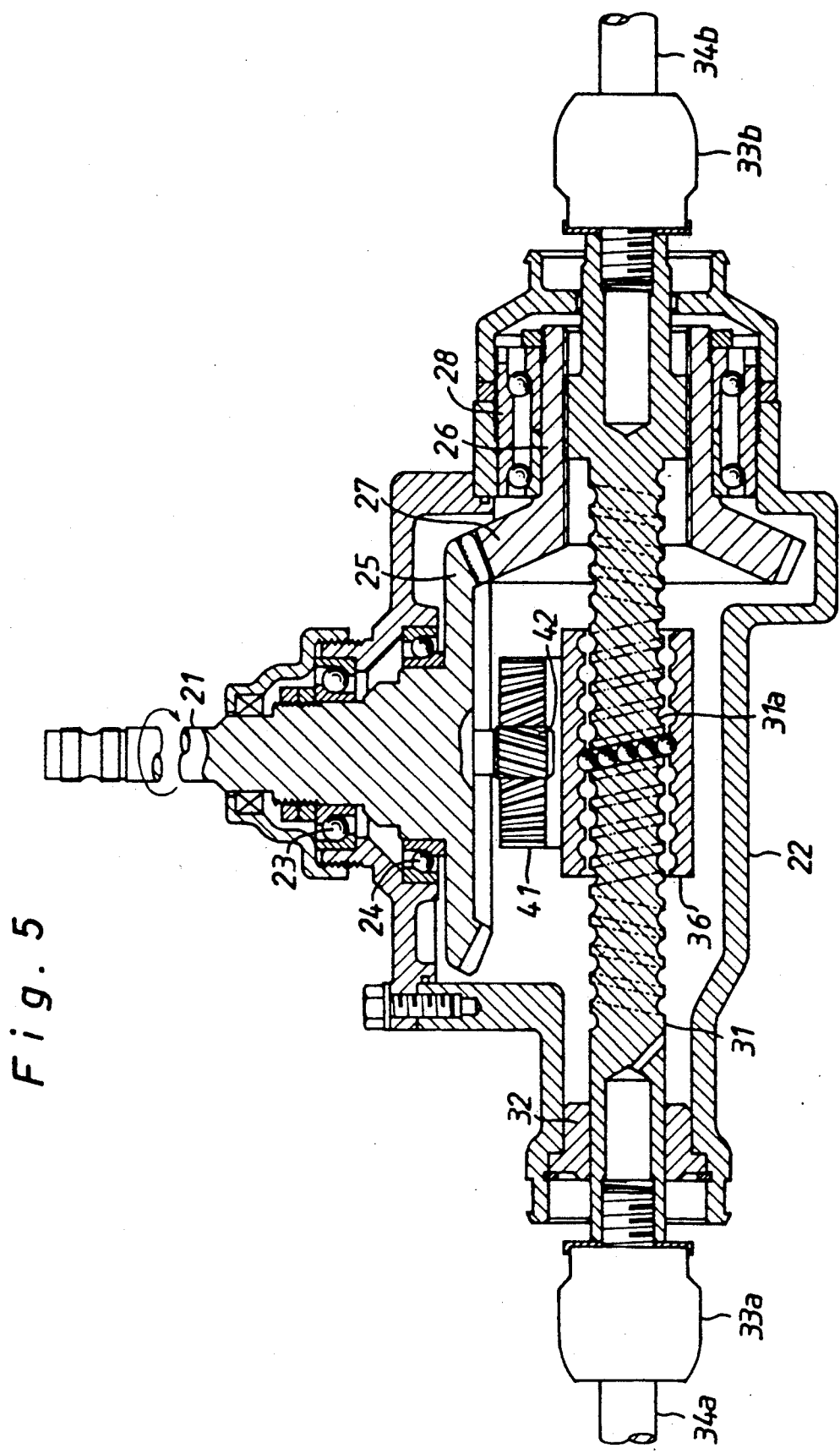
FIG. 5 is an enlarged sectional plan view of a modification of the rear-wheel steering mechanism shown in FIG. 2.
Figure 6A:
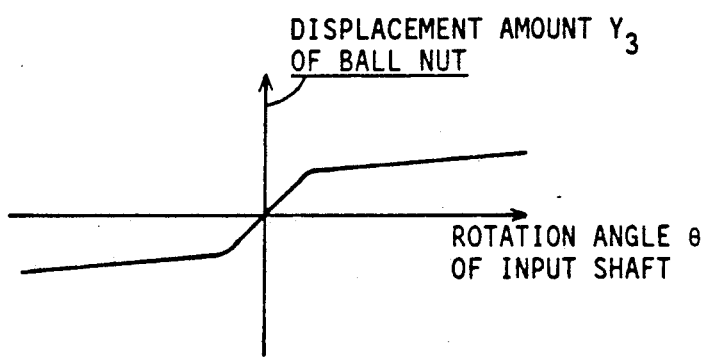
FIG. 6(a) is a graph showing a displacement amount of the ball nut in relation to a rotation angle of the input shaft in the modified rear-wheel steering mechanism.
Figure 6B:
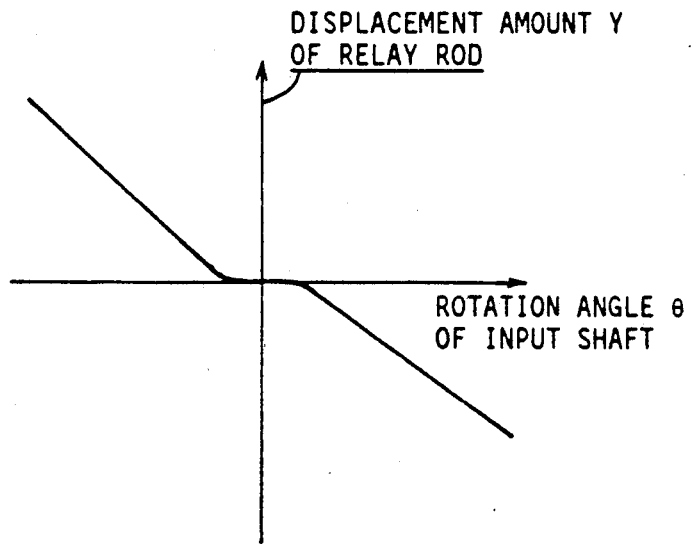
FIG. 6(b) is a graph showing a displacement amount of the lateral relay rod in relation to the rotation angle of the input shaft in the modified rear-wheel steering mechanism.

In FIG. 5, there is illustrated a modification of the rear-wheel steering mechanism wherein the ball nut 36 is integrally formed with a lateral rack portion 41 which is in meshing engagement with a pinion 42 fixed to the rear end of input shaft 21. The lateral rack portion 41 of ball nut 36 is formed thereon with variable rack teeth for engagement with the pinion 42. Assuming that the steering wheel 11 has been operated to rotate the input shaft 21 clockwise as shown by an arrow in FIG. 5, the lateral relay rod 31 is displaced rightward in accordance with the rotation angle of input shaft 21, while the ball nut 36 is displaced leftward as shown in FIG. 6(a). In this instance, the leftward displacement amount $Y_3$ of ball nut 36 will change at the same ratio as the displacement amount $Y_1$ of relay rod 31 when the rotation angle $\theta$ of input shaft 21 is in a small region. As a result, the actual displacement amount Y of relay rod 31 relative to the housing 22 will change in accordance with the rotation angle $\theta$ of input shaft 21 as shown in FIG. 6(b).

Having now fully set forth both structure and operation of certain preferred embodiments of the concept underlying the present invention, various other embodiments as well as certain variations and modifications of the embodiments herein shown and described will obviously occur to those skilled in the art upon becoming familiar with said underlying concept. It is, therefore, to be understood that within the scope of the appended claims, the invention may be practiced otherwise than as specifically set forth herein.

What is claimed is:

1. A four-wheel steering system in a wheeled vehicle having a front-wheel steering mechanism operable in response to the driver's effort applied to a steering wheel of the vehicle to steer a pair of dirigible front road wheels and a rear-wheel steering mechanism drivingly interconnected to the front-wheel steering mechanism by means of a mechanical linkage to steer a pair of dirigible rear road wheels in dependence upon the turn-angle of the steering wheel, wherein the rear-wheel steering mechanism comprises:

a housing mounted on a body structure of the vehicle;

an input shaft rotatably mounted within said housing and having a front end drivingly connected to said front-wheel steering mechanism through said mechanical linkage;

a lateral relay rod arranged on an axis perpendicular to the axis of said input shaft and being axially slidable and rotatably mounted within said housing, said relay rod having an intermediate portion formed thereon with a screw groove containing therein a plurality of balls and being operatively connected at the opposite ends thereof to the rear road wheels;

means for effecting rotary motion of said relay rod in accordance with a rotation angle of said input shaft;

a ball nut assembled with a rear end of said input shaft and having an axial bore formed with a screw groove containing therein said balls, said ball nut being coupled over the intermediate portion of said relay rod through said balls to effect axial displacement of said relay rod in accordance with rotary motion of the same; and means for effecting axial displacement of said ball nut in the opposite direction relative to the displacement direction of said relay rod in accordance with the rotation angle of said input shaft when said input shaft is rotated at a small angle.

2. A four-wheel steering system as claimed in claim 1, wherein said means for effecting rotary motion of said relay rod comprises a first bevel gear of large diameter mounted on the rear end of said input shaft for rotation therewith and a second bevel gear of small diameter formed on one end of a sleeve member and being in meshing engagement with said first bevel gear, said sleeve member being rotatably mounted within said housing in surrounding relationship with said relay rod and connected to said relay rod for rotation therewith.

3. A four-wheel steering system as claimed in claim 2, wherein said means for effecting axial displacement of said ball nut comprises a spherical bearing rotatably coupled within the rear end of said input shaft, and a radial projection integrally provided with said ball nut and being axially slidably supported by said spherical bearing, said radial projection having an axis inclined at a predetermined angle with respect to the axis of said input shaft such that the center of said spherical bearing is displaced in a predetermined distance from the axis of said input shaft in a condition where said input shaft is maintained in a neutral position.

4. A four-wheel steering system as claimed in claim 2, wherein said means for effecting axial displacement of said ball nut comprises a pinion fixed to the rear end of said input shaft and a lateral rack portion integrally formed with said ball nut and being in meshing engagement with said pinion, said lateral rack portion being formed thereon with variable rack teeth for engagement with said pinion.

* * * * *